(12) United States Patent
Salandre et al.

(10) Patent No.: US 11,220,155 B2
(45) Date of Patent: Jan. 11, 2022

(54) VEHICLE AIR VENT

(71) Applicant: Faurecia Interior Systems, Inc., Auburn Hills, MI (US)

(72) Inventors: Maxime Salandre, Rochester, MI (US); Vincent Nicolazzo, Washington Township, MI (US); Daniel Vandersluis, Rochester Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 325 days.

(21) Appl. No.: 16/119,497

(22) Filed: Aug. 31, 2018

(65) Prior Publication Data

US 2020/0070622 A1 Mar. 5, 2020

(51) Int. Cl.
*B60H 1/00* (2006.01)
*F25B 21/00* (2006.01)

(52) U.S. Cl.
CPC ..... *B60H 1/00492* (2013.01); *B60H 1/00864* (2013.01); *B60H 1/00885* (2013.01); *F25B 21/00* (2013.01); *F25B 2321/0022* (2013.01)

(58) Field of Classification Search
CPC .. B60H 1/00885; B60H 1/00864; B60H 1/30; B60H 1/3428; B60H 2001/3471; F25B 21/00492; F25B 2321/002; F25B 2321/0022; F25B 21/00; Y02B 30/66; F24F 11/74
See application file for complete search history.

(56) References Cited

U.S. PATENT DOCUMENTS

| | | | |
|---|---|---|---|
| 7,481,063 B2 | 1/2009 | Kitanovski et al. | |
| 9,369,027 B2 * | 6/2016 | Luo | H02K 9/20 |
| 9,400,126 B2 | 7/2016 | Takahashi et al. | |
| 9,599,374 B2 | 3/2017 | Takahashi et al. | |
| 10,557,649 B2 * | 2/2020 | Schroeder | F25B 21/00 |
| 2009/0318069 A1 * | 12/2009 | Konet | B60H 1/3428 |
| | | | 454/155 |
| 2013/0298571 A1 | 11/2013 | Morimoto et al. | |
| 2014/0165595 A1 | 6/2014 | Zimm et al. | |
| 2016/0357629 A1 | 12/2016 | Chinnakkonda Vidyapoornachary et al. | |
| 2016/0370037 A1 | 12/2016 | Morimoto et al. | |

FOREIGN PATENT DOCUMENTS

| | | | | |
|---|---|---|---|---|
| DE | 102006014596 B4 * | 2/2008 | | F25B 21/00 |
| KR | 20090114070 A * | 11/2009 | | |
| KR | 20130005076 A * | 1/2013 | | |
| KR | 101433342 B1 * | 8/2014 | | |
| WO | WO-2007110066 A3 * | 11/2007 | | B60H 1/32 |

* cited by examiner

*Primary Examiner* — Frantz F Jules
*Assistant Examiner* — Martha Tadesse
(74) *Attorney, Agent, or Firm* — Reising Ethington P.C.

(57) ABSTRACT

An air vent for thermally controlling the temperature in the cabin of a vehicle. The air vent includes an air mover and a plurality of thermal control channels. Each thermal control channel of the plurality of thermal control channels includes a magnetocaloric material. Further, the air vent includes a magnet for inducing a changing magnetic field in the magnetocaloric material, as well as a vent damper downstream of the plurality of thermal control channels. The vent damper is configured to selectively direct airflow from the air mover and divert air from at least one thermal control channel to a vent space and air from at least one other thermal control channel to a regulated temperature space.

18 Claims, 5 Drawing Sheets

VEHICLE AIR VENT

TECHNICAL FIELD

The invention relates to a vehicle air vent, and in particular, to a vehicle air vent that includes magnetocaloric material.

BACKGROUND

Magnetocaloric materials can be used to generate or remove heat from the surrounding environment when in the presence of a changing magnetic field. For example, U.S. Pat. Nos. 9,400,126 and 9,599,374 to Takahashi et al. disclose magnetic air conditioners that use stacked, alternating heat generation disks and magnetic field application disks. The heat generation disks are hollow compartments with a magnetocaloric material contained therein. The magnetic air conditioners have complex structures in which positive magnetic bodies that raise their own temperature upon the application of a magnetic field are alternately arranged with negative magnetic bodies that lower their own temperature.

SUMMARY

In accordance with one or more embodiments, there is provided an air vent for a vehicle, comprising: an air mover; a plurality of thermal control channels, wherein each thermal control channel includes a magnetocaloric material; a magnet configured to induce a changing magnetic field in the magnetocaloric material; and a vent damper downstream of the plurality of thermal control channels. The vent damper is configured to selectively direct airflow from the air mover through the thermal control channels and divert air from at least one thermal control channel to a vent space and air from at least one other thermal control channel to a regulated temperature space.

In some embodiments, there is a housing that at least partially encloses the air mover, the thermal control channels, and the vent damper.

In some embodiments, the magnet comprises at least one permanent magnet that rotates around each of the plurality of thermal control channels.

In some embodiments, the magnet comprises a plurality of electromagnetic coils, each electromagnetic coil being located in each of the plurality of thermal control channels.

In some embodiments, the vent damper is configured to rotate with respect to the thermal control channels.

In some embodiments, the vent damper includes a rotating outlet plate.

In some embodiments, the rotating outlet plate has a primary outlet, the primary outlet being sized to accommodate airflow from one of the thermal control channels.

In some embodiments, the rotating outlet plate has a secondary outlet that is smaller than the primary outlet.

In some embodiments, the vent damper includes a venting plate upstream of the rotating outlet plate.

In some embodiments, the plurality of thermal control channels are part of a thermal control cartridge having a plurality of inner walls, each inner wall dividing two thermal control channels, and a center hub joining the plurality of inner walls.

In some embodiments, the center hub accommodates a rotation crosspiece.

In some embodiments, the rotation crosspiece connects to the vent damper.

In some embodiments, the rotation crosspiece connects to the vent damper and the magnet via a support spoke, wherein a length of the support spoke is greater than a radius of the thermal control cartridge.

In accordance with one or more embodiments, there is provided a method of thermally controlling a vehicle with an air vent, the air vent comprising an air mover, a first thermal control channel including a magnetocaloric material, a second thermal control channel including a magnetocaloric material, a third thermal control channel including a magnetocaloric material, a magnet for inducing a magnetic field in the magnetocaloric material of the first, second, and third thermal control channels, and a vent damper downstream of the air mover and the first, second, and third thermal control channels, the vent damper configured to selectively direct airflow from the air mover. The method comprises the steps of: inducing a magnetic field in the magnetocaloric material in the first thermal control channel; outputting air passing through the first thermal control channel at a peak of the magnetic field induced in the magnetocaloric material in the first thermal control channel; inducing a magnetic field in the magnetocaloric material in the second thermal control channel; outputting air passing through the second thermal control channel at a peak of the magnetic field induced in the magnetocaloric material in the second thermal control channel; inducing a magnetic field in the magnetocaloric material in the third thermal control channel; and outputting air passing through the third thermal control channel at a peak of the magnetic field induced in the magnetocaloric material in the third thermal control channel.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The vehicle air vent described herein uses magnetocaloric material and a specialized vent damper to help regulate temperature in the vehicle cabin. The magnetocaloric material is used in thermal control channels, downstream of an air mover. As air flows through the air vent, the vent damper, which is downstream of the air mover and thermal control channels, can selectively divert warm or cool air depending on an implemented control scheme. The magnetocaloric material allows for the generation of heated and cooled air without the need for duct work coming from an HVAC system. Since duct work and input from the HVAC system is not necessarily needed, the air vents described herein can be put in any operable location in the vehicle to better accommodate occupants (e.g., rear occupants in car sharing situations).

The air vents disclosed herein can easily and economically be placed in typically difficult locations such as in door panels and in seat backs. Additionally, the air vents can be used in other vehicle interior panels such as instrument panels, or even overhead directly above a vehicle occupant. Further, the air vents can be used in various transportation means, such as vehicles designed for travel by road, air, water, or rail.

Figure 1:
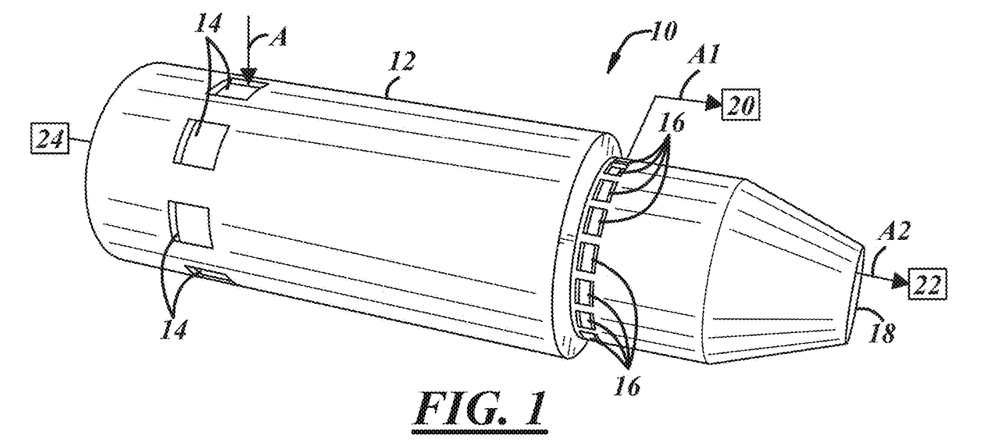
FIG. 1 is a perspective view of an embodiment of a vehicle air vent.

FIG. 1 illustrates an example vehicle air vent 10 adapted for installation in the passenger cabin of a vehicle. The air vent includes a housing 12 that generally encloses and protects the various interior components of the air vent 10. The housing 12 is generally cylindrical, however, other shapes, sizes, and configurations are certainly possible. The housing 12 includes air inlet passageways 14, venting passageways 16, and an outlet passageway 18. In operation, airflow A enters the air vent 10 through one or more of the air inlet passageways 14. The airflow A moves through the air vent 10 and is then split into a first airstream A1 that exits through the venting passageways 16 and a second airstream A2 that exits through the outlet passageway 18. Airflow path A1 diverts to a vent space 20, and airflow path A2 diverts to a regulated temperature space 22 in the vehicle cabin. Accordingly, the outlet passageway 18 is preferably situated such that it is in-line with the vehicle interior cabin, or extends into the vehicle interior cabin, such that the airflow A2 heats or cools the interior cabin of the vehicle, depending on the implemented control scheme. The inlet passageways 14 and the venting passageways 16 are typically not situated within the vehicle cabin. The inlet passageways 14 may take in airflow A from outside of the vehicle directly, be connected to a vent or duct to the exterior or another source of intake air, or be connected to a larger HVAC system. The venting passageways 16 may output airflow path A1 to a vent space 20 such as the exterior of the vehicle, the trunk of the vehicle, inside a seat or vehicle panel, or another location that is generally remote from the vehicle cabin (e.g., used to heat a propulsion system component or provide some other various vehicle functionality). This may be accomplished via a direct duct or connection, or through a larger HVAC system, to cite a few examples. As used herein, the terms "downstream" and "upstream" are in reference to the primary direction of airflow A from the inlet passageways 14 toward the outlet passageway 18 (i.e., the outlet passageway 18 is downstream of the inlet passageways 14 and the inlet passageways 14 are upstream of the outlet passageway 18).

FIG. 1 also schematically illustrates a motor/controller 24 that may be used to control one or more interior components of the air vent 10. In some embodiments, the motor/controller 24 may be a dedicated component for the air vent 10. In other embodiments, the motor/controller 24 may be part of a larger system or module (e.g., an HVAC system, a body control module, etc.). The motor/controller 24 may include an electronic processor and memory for storing and implementing control scheme programming relating to operation of the air vent 10. Operation of the motor/controller 24 may be accomplished over a network in the vehicle such as a CAN bus or LIN. In some embodiments, a network connects a number of air vents 10 throughout the vehicle cabin.

Figure 2:
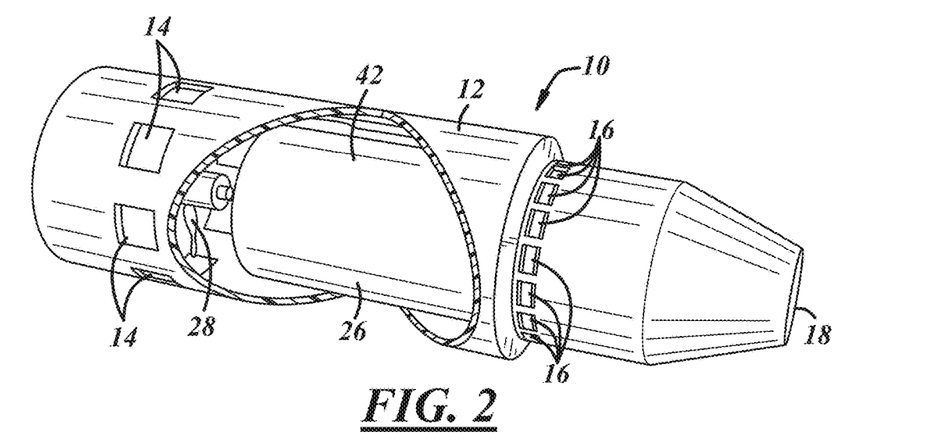
FIG. 2 is a perspective view of the vehicle air vent of FIG. 1 with a portion of the housing cutaway.
Figure 3:
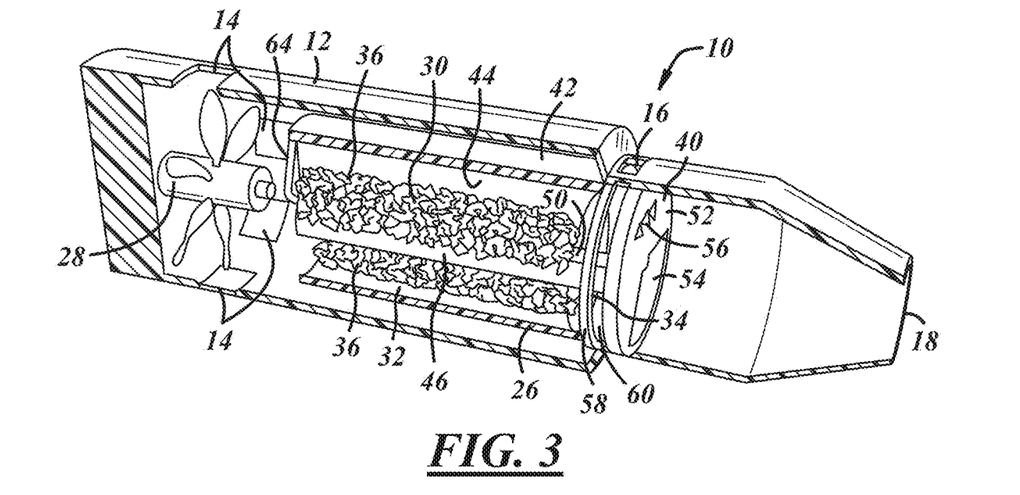
FIG. 3 is a perspective view of the vehicle air vent of FIGS. 1 and 2 with portions of the housing and a thermal control cartridge cutaway.
Figure 4:
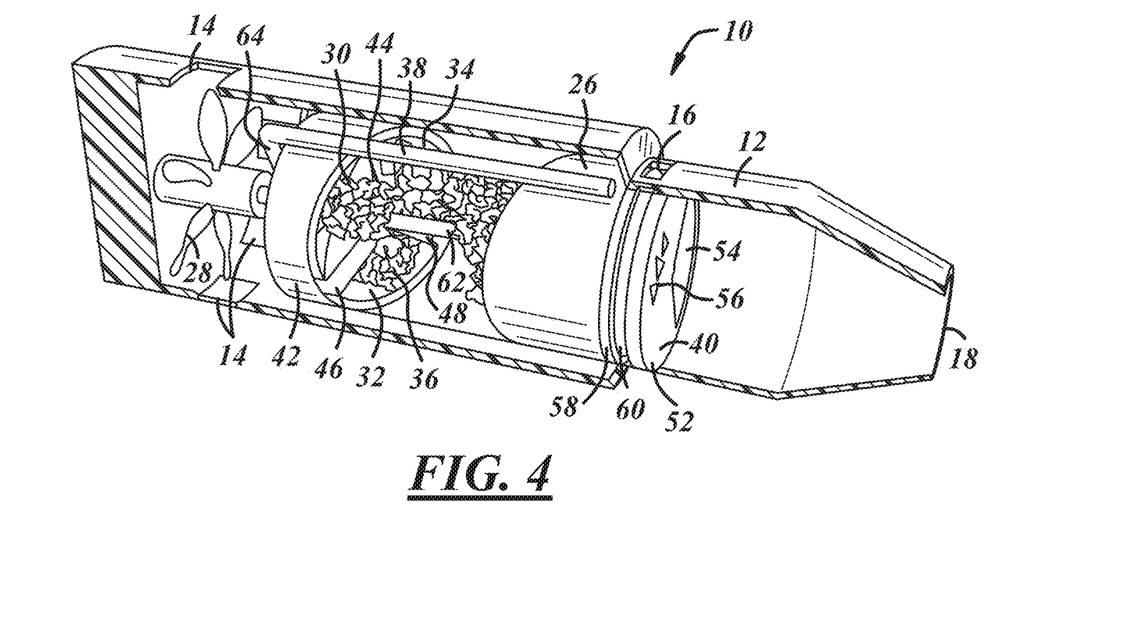
FIG. 4 is another perspective view of the vehicle air vent of FIGS. 1-3 with portions of the housing and the thermal control cartridge cutaway.

FIGS. 2-4 are various cutaway views of the air vent 10 of FIG. 1. A number of the schematically represented external components such as the vent space 20, the regulated temperature space 22, and the motor/controller 24 are not illustrated in these figures or the remaining figures. In FIG. 2, part of the housing 12 is removed so as to show a thermal control cartridge 26 within the housing 12. The thermal control cartridge 26 is located downstream of an air mover 28, as shown in FIGS. 3 and 4, and the thermal control cartridge 26, in this embodiment, includes three thermal control channels 30, 32, 34. The air mover 28 is a blower located upstream of the thermal control cartridge 26 and at least partially downstream of the inlet passageways 14, although other implementations and locations for the air mover 28 are possible. Each of the thermal control channels 30, 32, 34 include a magnetocaloric material 36, the thermal properties of which are alterable when subjected to a changing magnetic field. In the embodiment of FIGS. 1-5, this field is provided by a permanent magnet 38 that rotates around the thermal control cartridge 26. Downstream of the thermal control channels 30, 32, 34, a vent damper 40 is used to selectively direct airflow from the air mover 28 and divert air A1 from at least one thermal control channel 30, 32, 34 to the vent space 20 via venting passageways 16. Additionally, the vent damper 40 diverts air A2 from the other thermal control channel or channels to the regulated temperature space 22 via outlet passageway 18.

Figure 5:
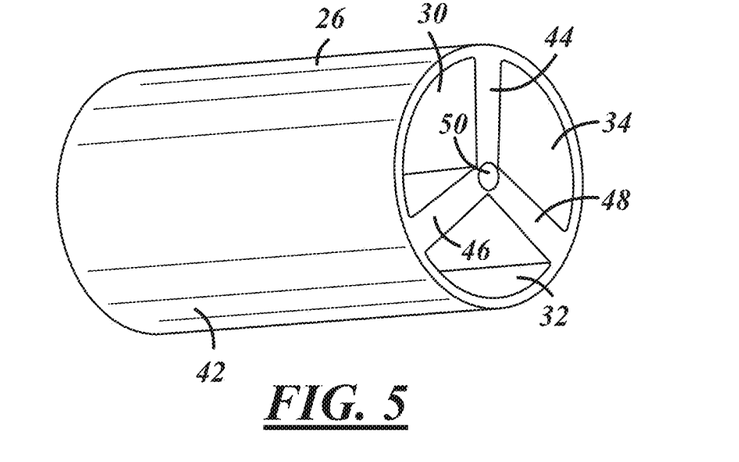
FIG. 5 is a perspective view of the thermal control cartridge of FIGS. 1-4.

FIG. 5 shows the thermal control cartridge 26 and the three thermal control channels 30, 32, 34. The thermal control cartridge 26 includes an outer wall 42, inner walls 44, 46, 48, and a center hub 50. The thermal control cartridge 26 is generally open at both its upstream and downstream ends to facilitate airflow therethrough. In some embodiments, the inner walls 44, 46, 48 may extend all the way to housing 12 such that the cartridge 26 is not an entirely separate component from the housing 12. Also, the thermal control cartridge 26 has a cylindrical shape with three inner walls 44, 46, 48 to define or delineate the three thermal control channels 30, 32, 34. Other shapes for the thermal control cartridge 26 and its various features are certainly possible, and will likely depend on the number and configuration of the thermal control channels 30, 32, 34, and possibly the configuration of the housing 12. In this embodiment, the cylindrical thermal control cartridge 26 with its three thermal control channels is advantageous from an operational standpoint, as this configuration can be more easily implemented in a coaxial relationship with the vent damper 40, which will be detailed further below. Further, elongated channels as illustrated that generally extend from the air mover 28 to the vent damper 40 allow for greater exposure to the magnetocaloric material 36. In some embodiments, there may be more or less thermal control channels or differently shaped thermal control channels than what is illustrated. Preferably, the thermal control channels 30, 32, 34 are elongated channels, as illustrated, that help maximize the heating and cooling of air flowing between the air mover 28 and the vent damper 40 by providing more surface contact with the magnetocaloric material 36.

The magnetocaloric material 36 is located in each of the thermal control channels 30, 32, 34. The thermal properties of the magnetocaloric material 36 are alterable based on the induction of a magnetic field by magnet 38. The temperature or entropy of the magnetocaloric material 36 changes when the strength of the magnetic field is adiabatically adjusted. As the magnetic field rises to a high peak, magnetic disorder is reduced in the magnetocaloric material 36, bringing its heat capacity down and thereby releasing heat that warms the airflow A. When the magnetic field falls to a low peak (e.g., at or near zero field strength), magnetic disorder is increased in the magnetocaloric material 36, resulting in increased heat capacity that absorbs heat from the airflow A, thereby cooling it. In one embodiment, the magnetocaloric material 36 is provided in a mesh form in order to help maximize surface area contact between the magnetocaloric material 36 and the airflow A. The magnetocaloric material 36 may be comprised of a Heusler compound (e.g., a copper-, nickel-, cobalt-, iron-, or manganese-based Heusler compound), Prasedymium with nickel ($PrNi_5$), and/or gadolinium or a gadolinium-based alloy such as $Gd_5Si_2Ge_2$. All of the thermal control channels 30, 32, 34 may have the same magnetocaloric material 36, or the composition may vary between the various thermal control channels. For example, some thermal control channels may include magnetocaloric material that is more efficiently able to heat, while other thermal control channels may include a magnetocaloric material that is more efficiently able to absorb heat (i.e., cool).

Figure 6:
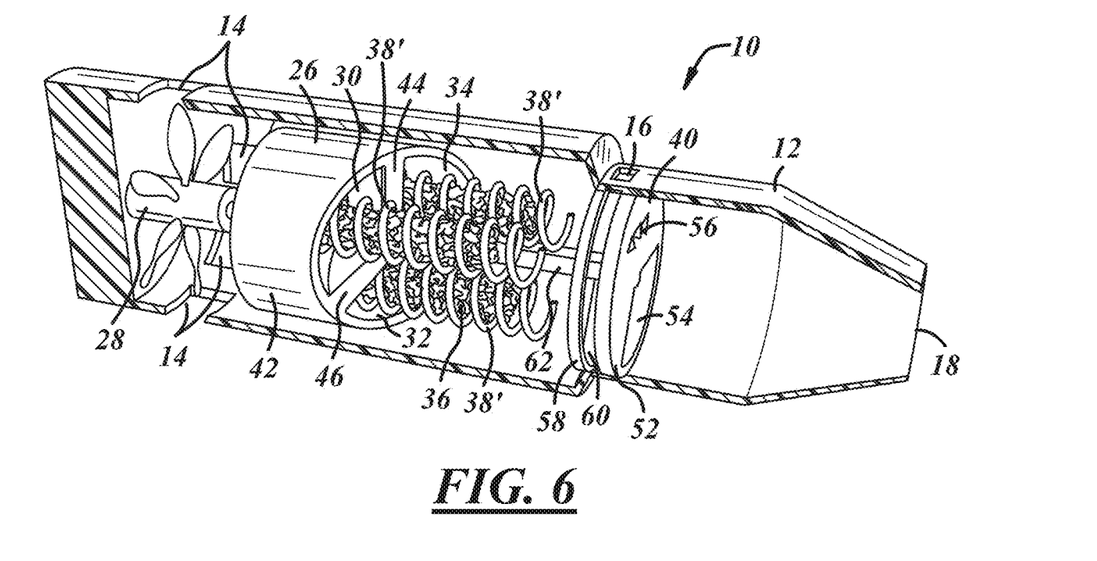
FIG. 6 is a perspective view of another embodiment of a vehicle air vent, with portions of the housing and thermal control cartridge cutaway.

Magnetic field induction may be accomplished via the magnet 38 which may have its poles at opposite ends of the lengthwise extent of the magnet, or instead facing radially away from each other relative to the axis about which it rotates. In this embodiment, the magnet 38 is configured to rotate around the thermal control cartridge 26, and accordingly, can rotate around each of the thermal control channels 30, 32, 34 which each contain the magnetocaloric material 36. The position of the magnet 38 relative to each of the thermal control channels 30, 32, 34 thereby dictates the strength of the magnetic field that impacts the magnetocaloric material 36. In another embodiment, a plurality of permanent magnets may be used and the position of the magnetocaloric material 36 can be adjusted in order to strengthen/weaken the magnetic field. In yet another embodiment, as illustrated in FIG. 6, a plurality of electromagnets 38' are employed, each of which comprising a coil that generally wraps around the magnetocaloric material 36 in each of the thermal control channels 30, 32, 34. In this embodiment, the electromagnets 38' are static and need not rotate. The activation of the electromagnets 38' or rotation of magnet 38 may be accomplished via motor/controller 24, to cite one example, and the electromagnets 38' may be selectively activated in accordance with a control scheme, which is detailed further below.

In view of the fact that the magnetocaloric material 36 in each of the thermal control channels 30, 32, 34 will generally switch between absorbing heat and releasing heat as the magnetic field increases and decreases, vent damper 40 can be used to control the airflow A1 that is vented to the vent space 20, as well as airflow A2 outputted to the regulated temperature space 22. As discussed below, if a vehicle occupant wants a warm air output, then the relative rotational orientation of the vent damper 40 may be adjusted so as to output to the regulated temperature space 22 a portion of the airflow A that is flowing over or through the portion of the magnetocaloric material 36 that is releasing heat, while diverting to the vent space 20 the other portion of the airflow A that is being cooled by the portion of the magnetocaloric material 36 that is absorbing heat. Similarly, if a vehicle occupant wants a cool air output, then the relative rotational orientation of the vent damper 40 may be adjusted so as to output to the regulated temperature space 22 a portion of the airflow A that is flowing over or through the portion of the magnetocaloric material 36 that is absorbing heat, while diverting to the vent space 20 the other portion of the airflow A that is being heated by the portion of the magnetocaloric material 36 that is releasing heat.

Figure 7:
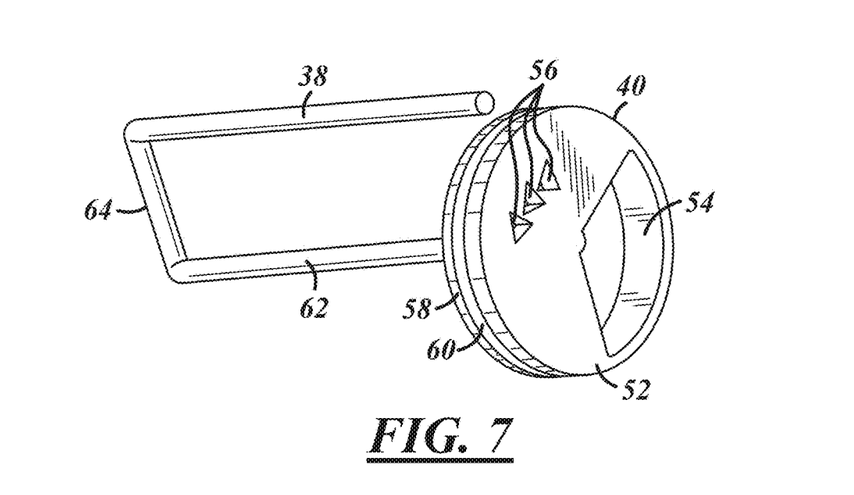
FIG. 7 is a perspective view of various internal components of the air vents of FIGS. 1-6.

FIG. 7 is an enlarged view of the vent damper 40, which is generally, in some embodiments, coaxial with the thermal control cartridge 26. The vent damper 40 includes a rotating outlet plate 52. The rotating outlet plate 52 includes a primary outlet 54 and a secondary outlet 56. The primary outlet 54 in this embodiment is sized to accommodate airflow from one of the thermal control channels 30, 32, 34. The secondary outlet 56 is generally smaller than the primary outlet 54, and as will be detailed below, can provide controlled access to one or more other thermal control channels 30, 32, 34. This may result in smoother phase transitions and a more consistent or constant stream of air A2 outputted from the outlet passageway 18. In some embodiments, the secondary outlet 56 may not be included. If an air vent 10 has more thermal control channels than what is illustrated, even further outlets may be included in the rotating outlet plate 52 of the vent damper 40.

The vent damper 40 may also include a venting plate 58 upstream of the rotating outlet plate 52. In some embodiments, the primary outlet 54 and the secondary outlet 56 extend through both the venting plate 58 and the rotation outlet plate 52, or the venting plate 58 may only partially cover the downstream end of the thermal control cartridge 26. One purpose of the venting plate 58 is to provide a gap 60 which allows for the ventilation of unwanted air A1 into the vent space 20, via venting passageways 16. One or more upstream facing lips or edges may be placed on the venting plate 58 to help block unwanted air from exiting via the primary outlet 54 and/or the secondary outlet 56, thereby guiding air A1 into the gap 60 to be vented via the venting passageways 16.

The vent damper 40 in this embodiment is connected to a drive shaft 62 which can extend through the center hub 50 of the thermal control cartridge 26. The shaft 62 also includes a radially-extending support spoke 64 which connects to and supports the magnet 38. Accordingly, in this embodiment, the rotation of the magnet 38 is keyed to the rotation of the vent damper 40, both of which may be powered by motor/controller 24. Also, in some implementations, shaft 62 may include a magnet. By positioning the primary outlet 54 at a particular angle with respect to the position of the magnet 38, the air vent 10 may thereby supply through the primary outlet 54 air that is constantly heated or cooled depending on the angle selected. Adjustment of the relative angle of the outlet 54 to the magnet 38 to switch between outputting warm air versus cooled air may be accomplished in any of a number of ways that will be apparent to those skilled in the art. For example, the outlet plate 52 may be rotationally adjustable on the drive shaft 62 through an angle of 180°, with the adjustment being electronically controlled by either a motor or other actuator, or manually adjustable by the user via one or more manual linkages to a control element that may be manipulated by a user in the cabin of the vehicle. In some embodiments, the vent damper 40 may rotate completely independently of the magnet 38 (e.g., in FIG. 6, where the rotation crosspiece 62 is used to transmit rotational motion to the output plate 52 from a source such as motor/controller 24, yet rotation of the electromagnets 38' is not needed). And in other permanent magnet embodiments as well, it is possible to have the vent damper 40 separately moveable from the magnet 38. With a cylindrical thermal control cartridge 26, it is advantageous for the support spoke 64 to be longer than a radius of the thermal control cartridge such that the magnet 38 located within the housing 12 radially outwardly of the thermal control cartridge.

Figure 8:
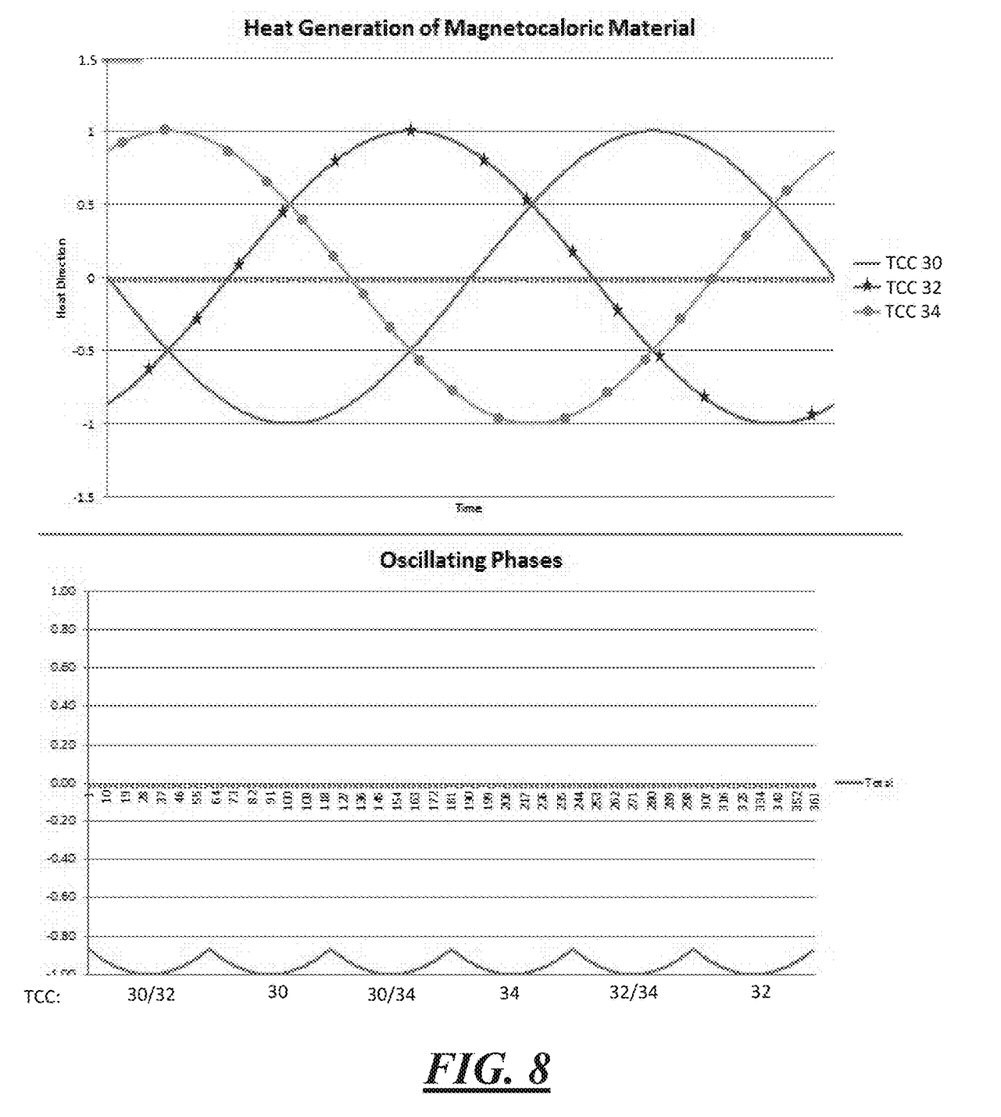
FIG. 8 includes graphs illustrating one embodiment of a control scheme of operating a vehicle air vent.
Figure 9:
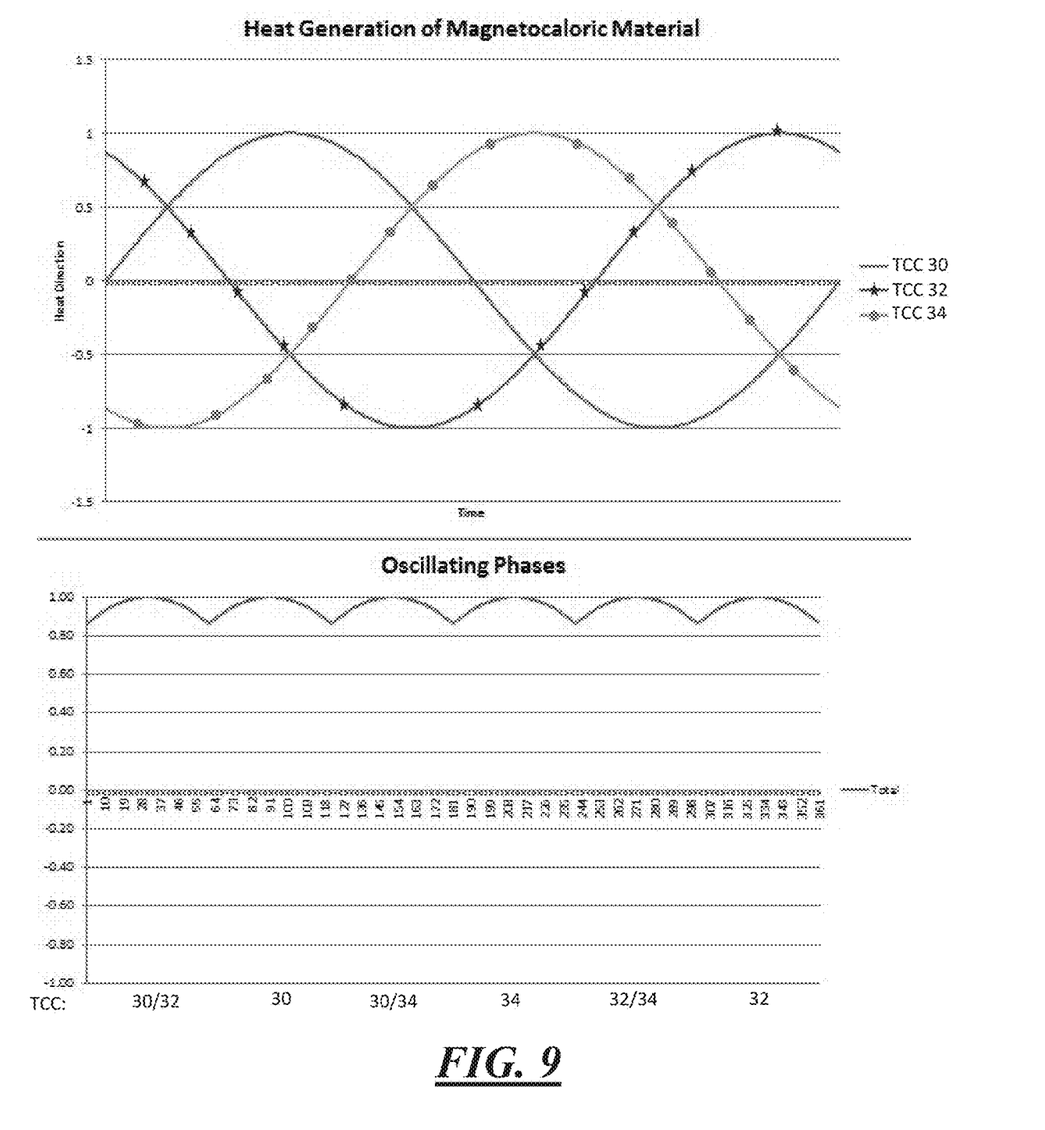
FIG. 9 includes graphs illustrating another embodiment of a control scheme of operating a vehicle air vent.

Rotation of vent damper 40, and thus selective exposure of the thermal control channels 30, 32, 34 to either the venting passageways 16 or the outlet passageway 18 may be accomplished with the control scheme illustrated in the graphs of FIGS. 8 and 9. As described above, the temperature of the magnetocaloric material 36 oscillates between warming and cooling as the magnetic field strength changes. In FIGS. 8 and 9, this oscillation of the heat generation is illustrated for each of the three thermal control channels 30, 32, 34 (see legend for TCC 30, TCC 32, and TCC 34). The top graph in each of FIGS. 8 and 9 illustrate the heat generation/absorption of the segment of magnetocaloric material 36 in each of the designated thermal control channels 30, 32, 34 as the magnet 38 rotates with respect to the thermal control cartridge 26. The bottom graph in each of FIGS. 8 and 9 illustrate which of the thermal control channels 30, 32, 34 aligned with the primary outlet 54 at a point in time during which the aligned channel(s) are providing cooling air (FIG. 8) or warming air (FIG. 9). FIG. 9 is phase shifted 180° to produce warm air as opposed to the cool air output illustrated in FIG. 8. If the phases are oscillated from TCC 30-TCC 34-TCC 32-TCC 30-TCC 34, etc., then warmer or cooler air can be constantly generated depending on when, in each phase cycle, air from air mover 28 is passed through the magnetocaloric material 36. As shown in FIGS. 8 and 9, the phases are blended into TCC 30/32-TCC 30-TCC 30/34-TCC 34-TCC 32/34-TCC 32, etc. for a much smoother generation of warm air and cool air, respectively.

In some embodiments, only one thermal control channel 30, 32, 34 may be exposed at one time via the primary outlet 54, without blending phases. The two thermal control channels that are not exposed can be vented via venting passageways 16 to the vent space 20. On the other hand, to accomplish the blended phases, vent damper 40 may be rotated to situate both the primary outlet 54 and the secondary outlet 56 in front of the thermal control channels 30, 32, 34 that are to produce airflow A2 to be output to the regulated temperature space 22. The third thermal control channel that is not exposed can be vented via venting passageways 16 to the vent space 20. In another embodiment, to accomplish the blended phases, vent damper 40 may be rotated such that the primary outlet 54 is situated between two thermal control channels 30, 32, 34, with the third thermal control channel that is not exposed being vented through venting passageways 16 to the vent space 20.

In yet another embodiment that uses one or more permanent magnets, the relative rotation between the magnet(s) and magnetocaloric material 36 may be achieved by mounting the magnet(s) in a fixed (static) position, for example, on the housing 12, and mounting the thermal control cartridge 26 for rotation on the drive shaft 62. In this embodiment, the vent damper 40 remains stationary except for the outlet plate 52 that may be rotated so as to locate the primary outlet 54 in line with the angular position at which the desired temperature of airflow (heated or cooled) is produced.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An air vent for a vehicle, comprising:
an air mover;
a plurality of thermal control channels, wherein each thermal control channel includes a magnetocaloric material;
a magnet configured to induce a changing magnetic field in the magnetocaloric material; and
a vent damper downstream of the plurality of thermal control channels,
wherein the vent damper is configured to selectively direct airflow from the air mover through the plurality of thermal control channels and divert air from at least one thermal control channel to a vent space and air from at least one other thermal control channel to a regulated temperature space, and wherein the plurality of thermal control channels is located wholly between the air mover and the vent damper.

2. The air vent of claim 1, further comprising a housing that at least partially encloses the air mover, the thermal control channels, and the vent damper.

3. The air vent of claim 1, wherein the magnet comprises at least one permanent magnet that rotates around each of the plurality of thermal control channels.

4. The air vent of claim 1, wherein the vent damper is configured to rotate with respect to the thermal control channels.

5. The air vent of claim 4, wherein the vent damper includes a rotating outlet plate.

6. The air vent of claim 5, wherein the rotating outlet plate has a primary outlet, the primary outlet being sized to accommodate airflow from one of the thermal control channels.

7. The air vent of claim 6, wherein the rotating outlet plate has a secondary outlet that is smaller than the primary outlet.

8. The air vent of claim 5, wherein the vent damper includes a venting plate upstream of the rotating outlet plate.

9. The air vent of claim 1, wherein the plurality of thermal control channels are part of a thermal control cartridge having a plurality of inner walls, each inner wall dividing two thermal control channels, and a center hub joining the plurality of inner walls.

10. The air vent of claim 9, wherein the center hub accommodates a rotation crosspiece.

11. An air vent for a vehicle, comprising:
an air mover;
a plurality of thermal control channels, wherein each thermal control channel includes a magnetocaloric material;
a magnet configured to induce a changing magnetic field in the magnetocaloric material; and
a vent damper downstream of the plurality of thermal control channels,
wherein the vent damper is configured to selectively direct airflow from the air mover through the plurality of thermal control channels and divert air from at least one thermal control channel to a vent space and air from at least one other thermal control channel to a regulated temperature space, wherein the plurality of thermal control channels are part of a thermal control cartridge having a plurality of inner walls, each inner wall dividing two thermal control channels, and a center hub joining the plurality of inner walls, wherein the center hub accommodates a rotation crosspiece, and wherein the rotation crosspiece connects to the vent damper and the magnet via a support spoke, wherein a length of the support spoke is greater than a radius of the thermal control cartridge.

12. A method of thermally controlling a vehicle with an air vent, the air vent comprising an air mover, a first thermal control channel including a magnetocaloric material, a second thermal control channel including a magnetocaloric material, a third thermal control channel including a magnetocaloric material, a magnet for inducing a magnetic field in the magnetocaloric material of the first, second, and third thermal control channels, and a vent damper downstream of the first, second, and third thermal control channels, the vent damper configured to selectively direct airflow from the air mover, wherein the first, second, and third thermal control channels are part of a thermal control cartridge having a plurality of inner walls, each inner wall dividing two thermal control channels, and a center hub joining the plurality of inner walls, wherein the vent damper is coaxial with the thermal control cartridge, the method comprising the steps of:
inducing a magnetic field in the magnetocaloric material in the first thermal control channel;
outputting air passing through the first thermal control channel at a peak of the magnetic field induced in the magnetocaloric material in the first thermal control channel;
inducing a magnetic field in the magnetocaloric material in the second thermal control channel;
outputting air passing through the second thermal control channel at a peak of the magnetic field induced in the magnetocaloric material in the second thermal control channel;
inducing a magnetic field in the magnetocaloric material in the third thermal control channel; and
outputting air passing through the third thermal control channel at a peak of the magnetic field induced in the magnetocaloric material in the third thermal control channel.

13. The air vent of claim 1, wherein the vent space is an exterior of the vehicle, a trunk of the vehicle, or inside a seat of the vehicle.

14. The air vent of claim 1, wherein a center hub between the plurality of thermal control channels accommodates a rotation crosspiece that connects to the vent damper and the magnet via a support spoke.

15. The air vent of claim 1, wherein a drive shaft for the vent damper extends through a center hub between the plurality of thermal control channels.

16. The air vent of claim 9, wherein the vent damper is coaxial with the thermal control cartridge.

17. The air vent of claim 1, wherein the vent damper is coaxial with the plurality of thermal control channels.

18. The air vent of claim 1, wherein the magnet comprises a plurality of electromagnetic coils, each electromagnetic coil being located in each of the plurality of thermal control channels.

* * * * *